UNITED STATES PATENT OFFICE.

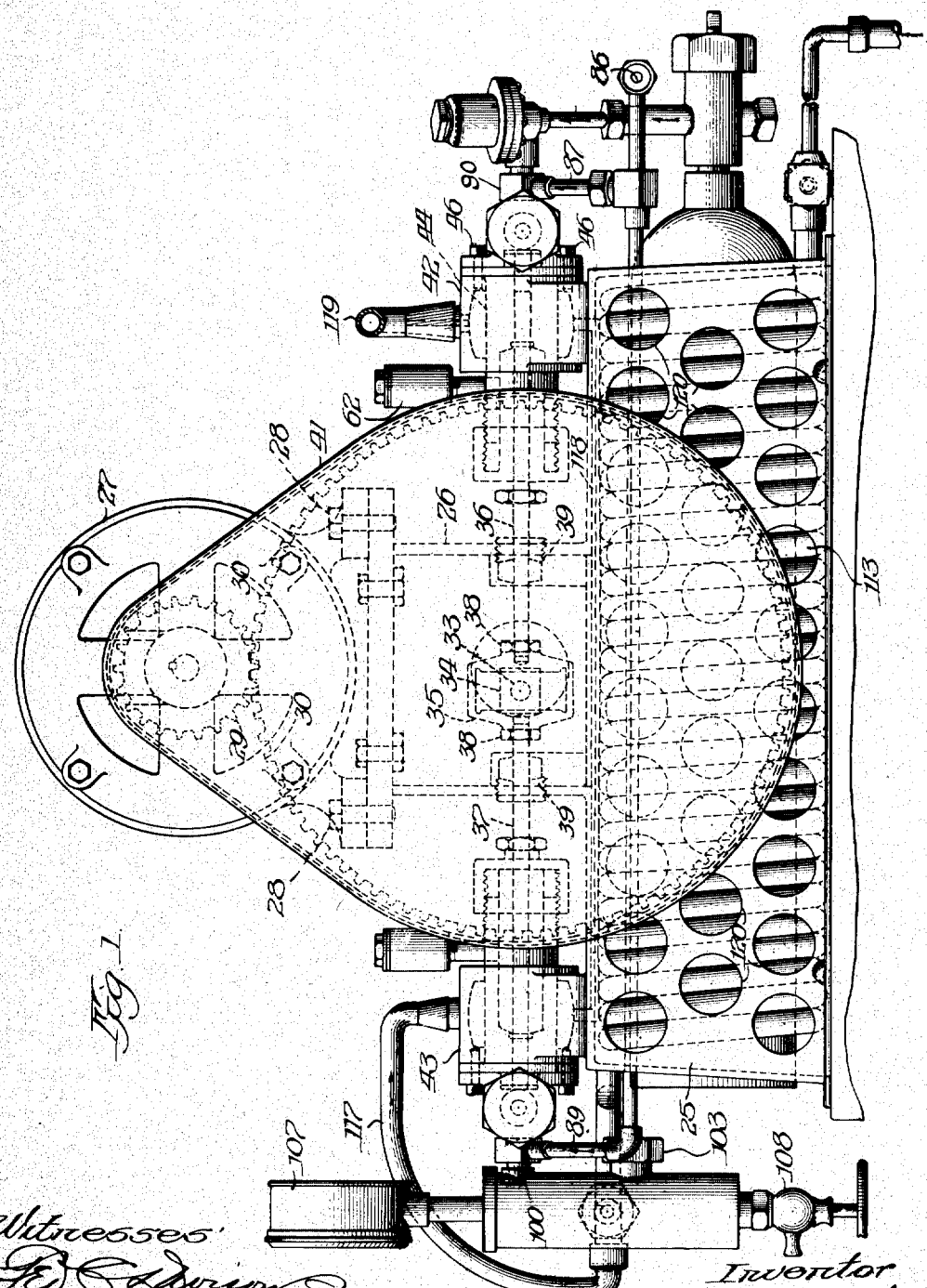

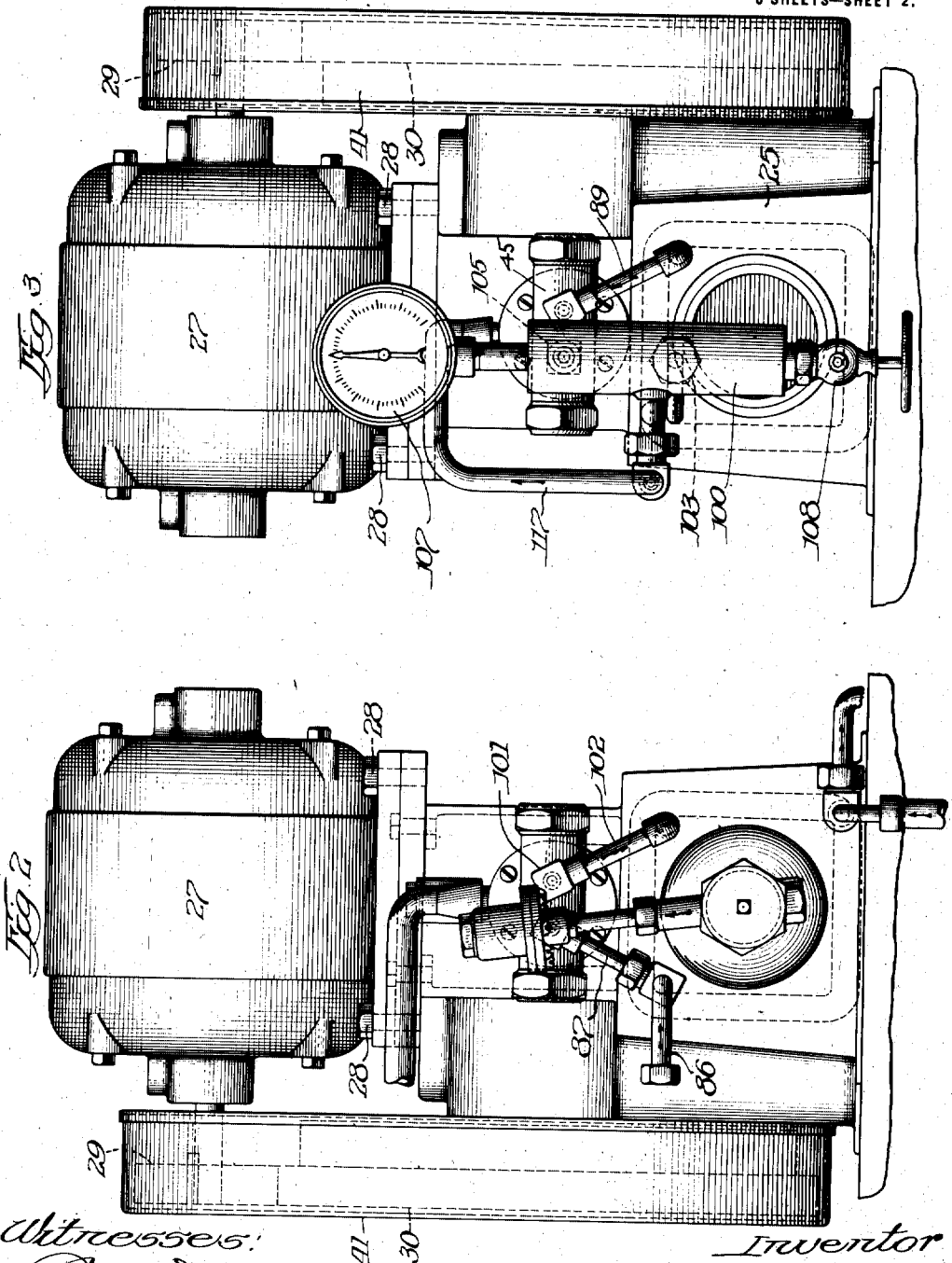

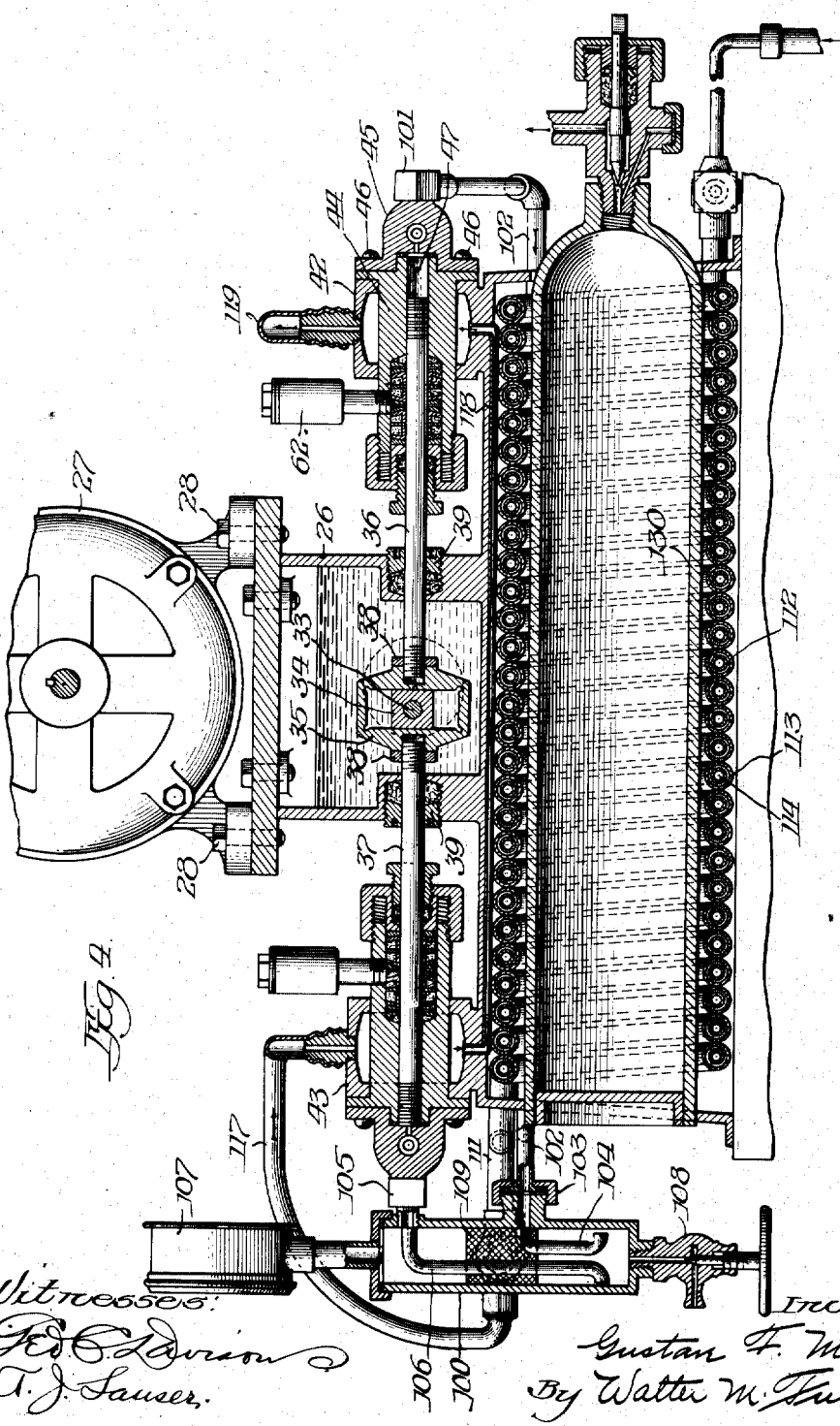

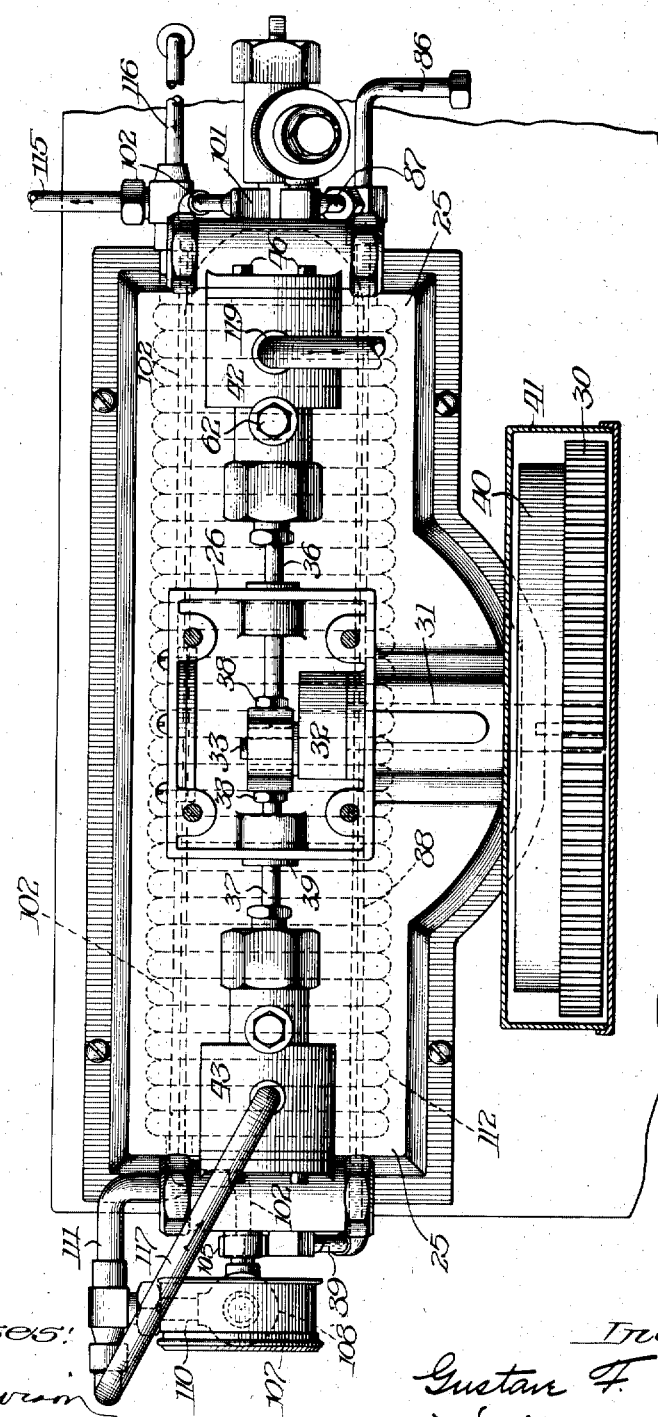

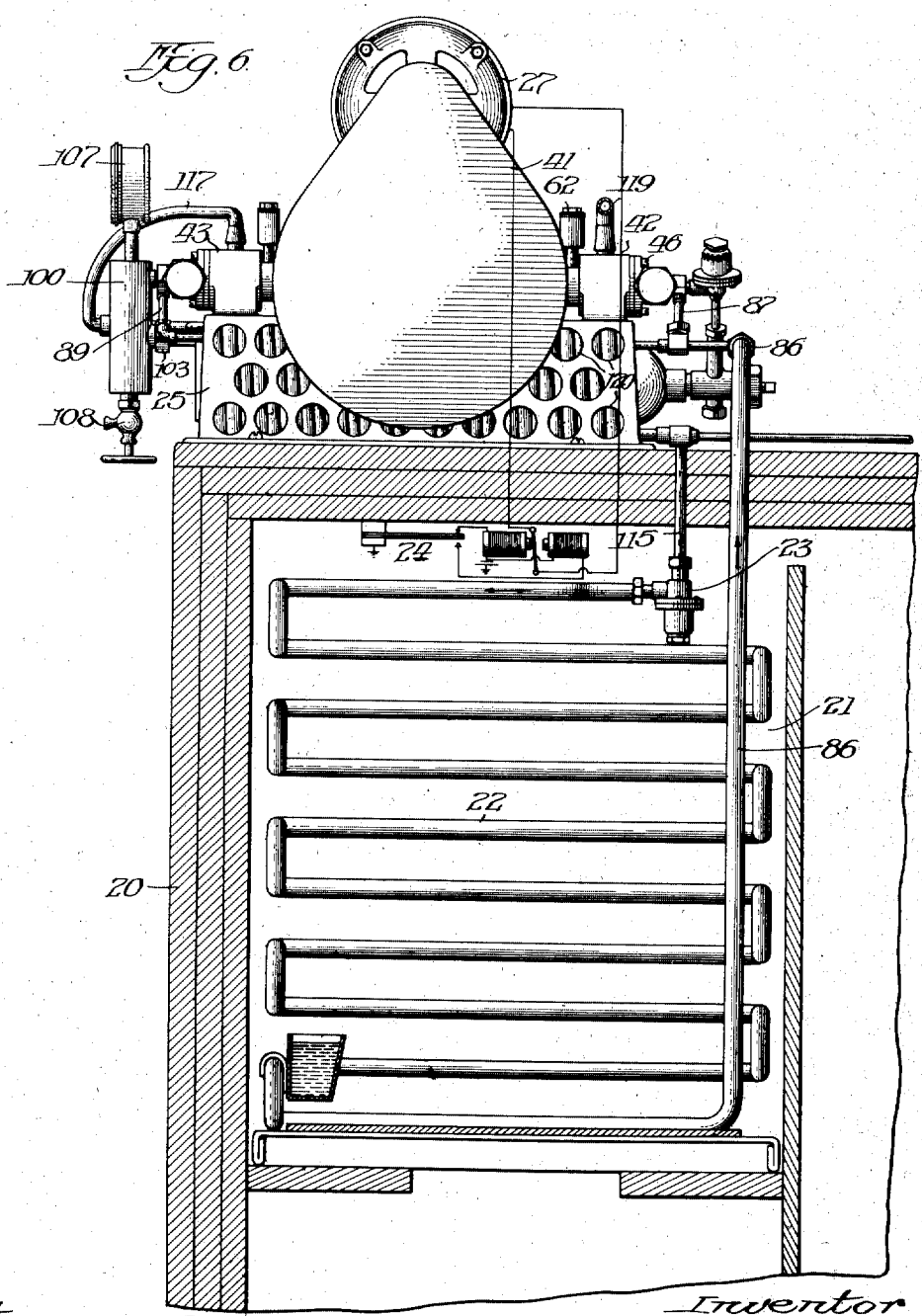

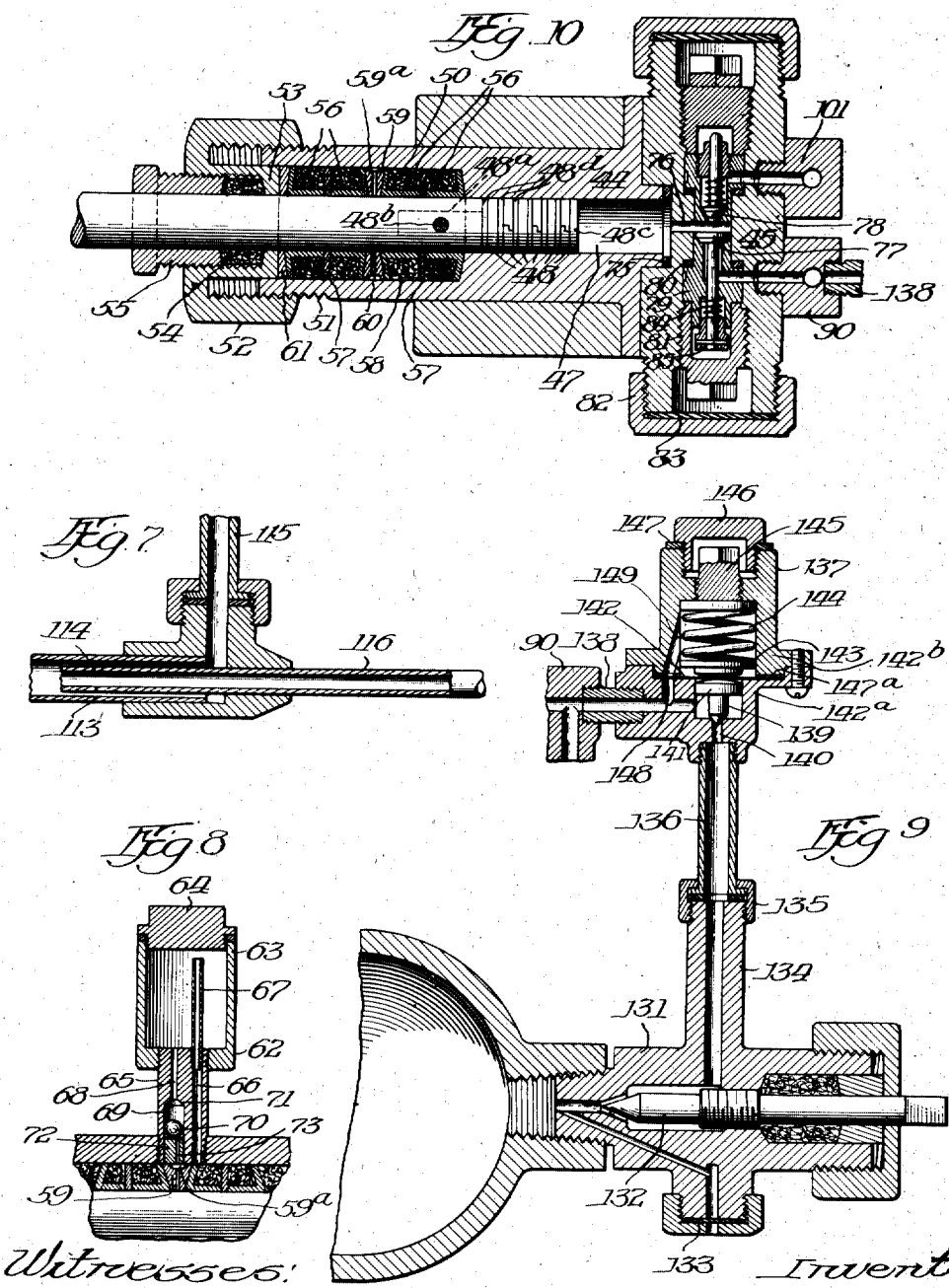

GUSTAVE F. MAISCH, OF CHICAGO, ILLINOIS.

REFRIGERATING APPARATUS.

1,225,453. Specification of Letters Patent. Patented May 8, 1917.

Application filed October 2, 1916. Serial No. 123,274.

*To all whom it may concern:*

Be it known that I, GUSTAVE F. MAISCH, a citizen of the United States, residing at Chicago, in the county of Cook and State of Illinois, have invented certain new and useful Improvements in Refrigerating Apparatus, of which the following is a specification.

My invention pertains to various features of novelty and improvement in refrigerating systems or appliances, and, although devices embodying the invention are capable of advantageous employment in many relations, and susceptible of being operated by various kinds of power, such as electricity, water, and the like, and may be direct, belt, or otherwise connected to the power device, there are certain characteristics of the apparatus which render it capable of economical use in connection with domestic refrigerators of the usual relatively-small capacity.

One of the prime purposes of the invention is the provision of a device of this general character which will use a harmless gas, dangerous and objectionable gases, such as ammonia, being prohibitive so far as home use is concerned.

Preferably, though not necessarily, I employ carbon dioxid gas, ($CO_2$), which requires a relatively-high pressure to insure its liquefaction, as compared with ammonia for instance, and, consequently, one of the problems to be solved by this invention was the production of a compressor which could economically and effectively produce such a pressure and maintain it for an unlimited period without attention and without substantial leakage from the system. A further feature of the invention was to use such a gas as would not corrode or detrimentally act upon the metal of the piping or other parts, and this carbon dioxid may well be used in this connection, because it has substantially no affinity for metal.

An added feature of the invention is the provision of automatically-acting means to replenish the charge of gas in the system as it is practically impossible to prevent some slight leakage or loss. This, in the preferred embodiment of the invention, is secured by using a supply-tank detachably connected to the piping system and containing a charge of the gas under substantial pressure, an automatic valve being used which regulates the admission of the new supply to keep a constant quantity of gas in the system. This tank is desirably located close to the gas-condenser, so as to be under the influence of the heat of the latter, thus assisting in maintaining or augmenting the gas pressure in the tank. Preferably, in order to make the appliance compact, this tank is located inside of the condenser from which it may be readily removed for replacement or recharging.

By using a double-acting gas-compressor or two compressors directly connected, so that when one portion is compressing its charge the other portion will be filling with gas under reduced pressure, this latter portion will act to assist the electric-motor or other driving means in the performance of its work, and, hence, the appliance as a whole can be compact and the motor of small capacity. This construction also results in a more evenly acting device and one which will, at all times, consume but little electric current, assuming, for example, that the appliance is electrically driven.

Another object of the invention is the provision of means for removing the oil or other lubricant from the gas to prevent its clogging any of the parts of the system. This is preferably accomplished just after the gas has been compressed and before it has entered the condenser.

In order to be suitable for domestic use the apparatus must be of small compass and economical to operate, which results are accomplished by this invention, which, in addition to possessing the desirable features above noted embodies many others which will be made apparent from a consideration of a preferred embodiment of the invention described below and illustrated in detail in the accompanying drawings, which form a part of this specification, and to which reference should be had.

In these drawings, like reference characters refer to the same parts throughout the various views.

In the drawings:

Figure 1 is an elevation of that portion of the apparatus ordinarily mounted on top of the refrigerator and includes all of the device with the exception of the refrigerating-coil, the controlling thermostat, and the expansion-valve contained within the refrigerator proper;

Fig. 2 is an end elevation of the device of Fig. 1 as viewed from the right-hand end;

Fig. 3 is an elevation of the opposite end of the apparatus;

Fig. 4 is a substantially-central, longitudinal vertical section through the appliance;

Fig. 5 is a plan view of the device with certain portions removed to more clearly illustrate the other parts of the mechanism;

Fig. 6 is a section through the refrigerator illustrating in elevation that portion of the device mounted on top of the refrigerator:

Fig. 7 is a detail section of a fragment of the condenser connection;

Fig. 8 is a section of the lubricating appliance for the piston or plunger rod of the compressor;

Fig. 9 is a fragmentary section illustrating the connection of the supply-tank to the system and the automatic admission valve associated therewith; and Fig. 10 is a section through a portion of the compressor showing the construction of the inlet and outlet valves.

Referring first to Fig. 6, it will be observed that the refrigerator 20 which it is intended to cool has its refrigerating compartment 21 occupied by a cooling coil 22 of any desirable shape. This chamber also accommodates an expansion-valve 23 in the piping system, which valve construction may be of any usual or desirable form. A thermostatically-actuated electric-switch 24 (shown diagrammatically), controlling the operation of the electric-motor, and the compressor driven thereby, is also contained in the upper portion of this compartment, and is adapted by its regulation of the motor to govern the cooling action of the coil on the refrigerator as a whole.

That portion of the apparatus mounted on top of the refrigerator, but which, of course, may be located at any other desirable place, includes a casting 25, the lower part of which accommodates a condenser and supply-tank to be described hereinafter, its upper portion supporting the double-acting compressor and its motor.

On top of an oil-containing compartment 26 forming a portion of the casting 25, an electric-motor 27 is mounted, as by means of the attaching screws 28, 28. A pinion 29 on the motor-shaft is in mesh with a larger gear 30 on a lower cross-shaft 31, suitably journaled in the casting and projecting into the oil chamber 26. The inner-end of shaft 31 is fitted with a collar 32 equipped with an eccentrically-positioned pin 33 provided with a rectangular bearing-block 34 accommodated and transversely reciprocable in a slotted cross-head 35, into the opposite ends of which the compressor piston or plunger rods 36 and 37 are screwed and maintained against unintentional detachment by lock-nuts 38, 38. As is clearly illustrated in Fig. 4, each of these rods 36 and 37 passes through a wall of the lubricant-containing chamber 26 in association with a suitable stuffing-box 39. In order to equalize and steady the action of the compressor, shaft 31 may be conveniently provided with a fly-wheel 40, the gears 29 and 30 and this fly wheel being inclosed within a suitable casing or housing 41, as is fully shown.

At each end the casting 25 is provided with hollow casings or housings 42 and 43 and each of these has its opposite walls apertured for the reception of a cylinder 44 so shaped as to provide between itself and the interior of the casing 42 or 43 a water-jacket space, as is clearly shown in Fig. 4. This cylinder, as well as an adjacent valve-containing end member 45 is fastened to the part 42 by means of a plurality of screws 46 extending through flanges of the parts 44 and 45 and engaging threaded apertures in the element 42. Each cylinder 44 has an axial bore 47 receiving the piston or plunger of the corresponding rod 36 or 37 as the case may be, each piston or plunger comprising a cylindrical shaft or body $48^a$, pinned at $48^b$ in a cavity in the end of the rod, and provided with a head $48^c$. Between such head and the end of the rod, the piston is equipped with a plurality (in the present instance, six), of so-called "leak-proof" rings 48, separated from one another by spacing washers $48^d$, the exterior diameters of the head, rings, and washers, being substantially the same.

Each cylinder 44 has an enlarged chamber 50 through which the piston rod extends, and which accommodates a suitable packing described below. A portion of the interior of the cylinder is threaded at 51 for the reception of a gland-member 52 having a gland-portion 53 accommodated partially in the cavity 50 and itself in turn internally recessed for a supplemental packing 54 held in adequate contact with the piston-rod by another threaded gland-member 55.

As is shown perhaps most clearly in Fig. 10, the cavity 50 contains two pairs of cup leather washers 56, 56, separated by flat leather washers 57, 57, the spaces between the washers being filled with a suitable hemp or other packing 58. At the middle of this packing is an interposed spacer or so-called "lantern" 59 radially apertured at 60 at a plurality of points, the thickness of the spacer being greater at its outer edge than at its inner portion, to secure a more effective squeezing or wedging action on the packing. Around the surface of the spacer 59 there is an annular groove 59ᵃ with which the passages 60 communicate. Just inside of the gland 53 there is another unapertured spacer or washer 61 also thicker at its outer edge than at its inner portion for a similar purpose.

By reference to Figs. 4 and 8 it will be noted that the upper part of the cylinder member 44 has an oil or lubricating device 62 threaded through the wall so as to be in communication with the cavity 50. This oil member comprises a shell or casing 63 equipped with a top closure 64 and at its lower end provided with a threaded stem 65 extended through the lower wall of the oil-containing chamber 63 and also through the wall of the cylinder. The part 65 has a passage 66 therethrough in communication with an upwardly-extending pipe 67 projecting through the oil in the chamber so that any gas passing through the connecting passages 66 and 67 will exert its pressure on the top of the oil, tending to force it down. Stem 65 also has another passage 68 opening downwardly into an enlargement 69 accommodating a ball-valve 70 which, when pressed up against the valve seat 71, closes the passage. The lower portion of the chamber 69 is fitted with a plug 72 having a small passage 73 extended therethrough and at one side of its axis so that when the ball 70 is in lowered position, as shown in Fig. 6, it will not close such passage.

It might be observed in passing that the packing spacer or lantern 59 in the present device has four of the radial passages 60, one of which is in substantial register with the lubricating appliance, as shown in Fig. 8.

Inasmuch as both cylinders of the compressor, as well as their packings and lubricating devices and other parts are alike, this description of one will suffice for both.

In appliances of this character, heretofore, it has been practically impossible to maintain the required pressures in the compressor by reason of leakage around the piston-rod, or, stated somewhat differently, it has been substantially impossible to keep the joints tight around the piston-rod and also maintain the latter properly lubricated. In the device of this invention, however, the pressure of the gas tending to escape around the piston-rod is employed to feed the lubricant to the packing and the rod.

The operation of this lubricating-device occurs practically as follows:

It is impossible to make the piston-rings 48 completely leak-proof, and, consequently, there will be some leakage of the gas around them. As the packing on that side of the spacer 59 toward the compressing chamber tends to dry out and permit a leakage of the compressed gas, then during the compression stroke of the piston the leaking gas has a comparatively ready admission to the chamber 69 through the passage 73 by reason of the proximity of the radial passage through the spacer 59, resulting in a comparatively quick raising of the ball valve 70 and closing of the passage 68. This gas also escapes into the part 63 through the passages 66 and 67, but the pressure in the oil-containing compartment does not rise as rapidly as it does beneath the ball-valve so that the latter is closed before a substantial increase of pressure above the oil. During the admission stroke of the piston there will be a slight leakage of gas past the piston-rings, but, of course, at a reduced pressure, and such reduction in pressure causes the ball 70 to drop before there is a substantial reduction in pressure above the oil in the member 63. The result is that the pressure above the oil then forces a charge of the same down through the passages 68, 69, and 73, and also through the spacer to the piston-rod. In this way, the latter is kept adequately lubricated by such pumping action of the escaping gas, although there will also be somewhat of a feed of oil at other times. This lubricant keeps the piston-rod properly oiled, and also acts to overcome the dryness of the packing which, when thus treated with the oil, swells up and acts to maintain a tighter joint, facilitating a maintenance of the required pressure. Of course, in time, the packing will again dry out somewhat owing to the heat of the compressor and a further feed of oil will be occasioned by the escaping gas, as described above.

Each member 45 has a packing 75 interposed between itself and the corresponding open end of the cylinder 44, each member 45 also having a passage 76 in communication with the interior of the corresponding cylinder and in connection with a spring-pressed inlet-valve 77 and a spring-pressed outlet or discharge-valve 78. The valve 77 is associated with a removable, ported valve-seat member 79, a shoulder of which is adequately pressed against a packing 80 bearing on a companion shoulder of the member 45 by means of a screw-threaded plug 81, the latter being covered and concealed by a screw-threaded cap 82 having a packing or gasket 83 between itself and the end of the part 45. It will be clear, therefore, that by removing the cap 82 and the plug 81 the valve and the valve-seat member may be readily taken out for repairs or replacement. Valve 77 is normally held closed by a spring 84 interposed between the base of a cavity in the member 79 and a collar 85 pinned to the valve-stem. The spring-pressed discharge-valve 78 is so closely similar to that of the inlet-valve that it needs no further description except to state that it opens outwardly instead of inwardly as does the inlet-valve. The manner of taking out the valve is substantially the same as that of its companion inlet-valve, however.

By means of pipes 86, (Fig. 6), 87, 88, and 89, connection is made between the lower end of the refrigerating-coil 22 and the passages of the two inlet-valves at the opposite ends of the double-acting compressor. Pipe 87 leads into the side of a connection-plug 90 (Fig. 1), screwed into the member 45.

At the left of the apparatus, as illustrated in Fig. 4, an oil-trap 100 is located to which the discharge-valves of both compressors are connected. This is accomplished for the right-hand end of the compressor by a connecting-plug 101 and a pipe 102, which, by means of a detachable connection 103, is in communication with a bent pipe 104 inside of the oil-trap housing. By means of a connecting-plug 105, a discharge valve of the left-hand portion of the compressor is in communication with a second curved pipe 106 inside of the oil separator casing 100. It will, therefore, be seen that the compressed gas from both parts of the compressor is directly delivered into this oil separator while still heated under the compression action, and before passing to the condenser, where a congelation of the oil would interfere possibly with the proper action of the device.

At its upper end this oil-separator is provided with a pressure-gage 107 which, of course, registers the pressure of the compressed gas delivered by the double-acting appliance. At its lower end the oil-separator is equipped with a discharge-valve 108 which at intervals may be opened by the operator to blow off any accumulation of lubricant.

From this oil separator, the compressed gas passes through a screen 109 and through a connecting-pipe 110 to a tube 111 forming an end of the condenser-coil 112. This coil consists of an outer pipe 113 and an inner pipe 114, the former being provided for the compressed gas and the latter for the passage of cooling water. The gas, therefore, between the inner surface of the outer pipe and the outer surface of the inner pipe is subjected to the cooling action of the water in the pipe and to the corresponding action of the air surrounding the outer pipe. Upon leaving the condenser the now liquefied gas passes through a pipe or tube 115 to the expansion-valve 23 which controls the evaporation or vaporization of the liquid gas into vapor in the refrigerating-coil 22.

The water for cooling the condenser-coil and also the two portions of the compressor, enters the pipe 114 of the condenser through a pipe 116 and leaves the other end of the condenser through a pipe or connection 117 which delivers it, as is shown in Fig. 4, to the casing or housing 43 surrounding the left-hand compressor cylinder. From the bottom of this casing, the water passes through a tube 118 to the lower portion of the casing 42 of the other compressor, leaving the top of the latter through a pipe 119. It will be clear, therefore, that the same water is used for cooling the condenser and both compressor cylinders, traversing first the condenser and then the jackets of the compressor cylinders in series. This water may be forced through the piping by any suitable form of pressure means or be made to traverse the system by reason of its thermal changes. It should be observed, furthermore, that in order to permit a free access of air to the condenser-coil 112, the walls of the casing 25 inclosing such coil are provided with a multiplicity of perforations 120.

In the operation of a system of this kind there is sure to be some loss of the refrigerating element through leakage, and in this improved device, automatic means are provided for replenishing the supply of such gaseous element. This means includes a supply-tank 130 containing a charge of gas under substantial pressure or in liquid form, that is to say, it is under a pressure greater than the minimum pressure in the refrigerating system. The tank is supported at its opposite ends by the end walls of the casting 25, as is clearly shown in Fig. 4, both of these walls being apertured for this purpose and also for the purpose of permitting ready removal of the tank when needed. By locating this tank adjacent to, and in the present instance, inside of the condenser, it is subjected to the heating influence of such surrounding condenser coil, which tends to maintain or increase the pressure of the gas so that a greater quantity can be automatically delivered to the system as occasion requires than could otherwise be accomplished.

The tank as is shown in Fig. 9, is provided with a stopper 131 equipped with a manually-operated screw-threaded needle-valve 132 and with a safety-disk 133 closing a supplemental discharge passage and subject to rupture if the pressure in the tank becomes excessive. A lateral delivery extension 134 of the stopper, by means of a detachable connection 135 of any suitable form, and a pipe 136, is connected to an automatic-valve 137 which in turn by a nipple 138 is connected to the apertured inlet plug 90 at the right-hand end of the appliance. The valve-member 137 contains a tapered valve 139 controlling a port 140 which connects the pipe 136 with the nipple 138. Valve 139 has an enlarged convex head 141 bearing against the lower side of a diaphragm 142 held at its margin securely between two separable portions 142$^a$ and 142$^b$ of the valve-casing. On the other side of the diaphragm, that is, above it, there is a bearing-member 143 pressed downwardly on the diaphragm in register with the valve-head 141 by a coil-spring 144, the pressure of which on the part 143 may be adjusted by a screw-threaded plug 145 covered by a threaded cap 146 having a packing 147 between itself and the end of the valve-casing. As is clearly shown in Fig. 9, the marginal or edge portions of the diaphragm, as well as a fiber gasket 147ª are securely held between the two members 142ª and 142ᵇ of the valve-casing, which two parts are held together by suitable screws. It should be noted that the cavity in the part 142ᵇ is somewhat larger in diameter than the cavity in the part 142ª accommodating the head 141 of the valve 139. It should be noted also that the diaphragm and gasket are apertured at one side of the valve at 148 in register with a passage 149 connecting the interior of the member 142 through the diaphragm and gasket with the interior of the part 142ᵇ. Obviously, then, the pressure of the gas on the reduced pressure side of the valve 139 is imposed on both sides of the diaphragm, but owing to the fact that a greater area of the latter is exposed to this gas pressure in the member 142ᵇ than in the chamber of member 142ª, such difference in pressure supplemented by the action of the spring 144 acts normally to hold the valve 139 closed.

If the pressure in the system becomes abnormally reduced, the valve 139 opens, permitting a supply of gas from the tank to enter the system, and as soon as the pressure is brought back to normal the valve is automatically closed due to the action of the spring and the pressure of the gas, as will be readily understood. The passage of the gas around this valve 139 may temporarily cause a deposit of frost which would act to close the valve, but owing to the exhaustion caused by the gas compressor as the gas pressure becomes thus further reduced, valve 139 again opens freeing the port from any such frost and then closes securely against its seat automatically.

Under normal conditions the pressure in the passage 140 acts upwardly upon the valve 139 tending to open it, but this is overcome by the action of the spring 144 and the greater gas pressure on the top of the diaphragm, which, as has been explained, is more than that on the underside of the diaphragm. If it is desired to maintain the refrigerating coil cooler, it is merely necessary to turn the plug 145, causing a greater pressure of the spring 144 on the valve, and, consequently, requiring a greater difference in pressure before the valve automatically opens to bring about the replenishment referred to.

From an understanding of the structural and functional advantages of the appliance as presented above, it will be clear that a harmless refrigerating gas is employed which does not tend to corrode the parts with which it comes in contact. It will be furthermore appreciated that the device is automatically acting to maintain a predetermined degree of temperature, and also to keep the system charged with gas to the proper extent. The supplemental supply tank will supply the needs of the system for an indefinite period, but when exhausted, it may be readily detached and a new one substituted in its place without interfering with the operation of the refrigerating apparatus as a whole.

This supply-tank is also located sufficiently close to the condenser to receive a transfer of heat therefrom. The water for cooling the appliance passes first through the condenser and then through the cooling jackets of the two cylinders in series. By employing a double-acting compressor the incoming gas under reduced pressure assists the motor in the performance of its work. Furthermore, the oil is removed from the compressed charge while the latter is still relatively hot and before it has an opportunity to congeal.

The device as a whole occupies but small space, is efficient in operation, and economical to operate.

While I have herein shown an electric-motor for actuating the appliance, it is to be understood that any kind of driving-means may be employed and for refrigerating cars, for instance, the appliance may be coupled directly with the axles of the trucks.

To those skilled in this art it will be clear that many minor mechanical changes may be incorporated in the appliance without departure from the heart and substance of the invention and without the sacrifice of any of its substantial benefits and advantages.

Certain features of construction described herein and illustrated in the drawings, but not claimed, constitute the subject-matter of co-pending applications, Serial No. 126,395, expansion valves, filed October 18, 1916, and Serial No. 152,514, compressors, filed March 6, 1917.

I claim:

1. In a refrigerating-appliance of the character described, the combination of a gas-compressor, a refrigerating-coil connected thereto, a supply-tank of gas under pressure, and an automatic-valve connecting said supply tank to the system and adapted to compensate for the leakage of gas from the system by admitting gas from the tank thereto, substantially as described.

2. In a refrigerating-appliance of the character described, the combination of a gas-compressor, a refrigerating-coil connected thereto, a supply-tank of gas under pressure, and an automatic-valve connecting said supply-tank to the system and adapted to compensate for the leakage of gas from the system by admitting gas from the tank thereto, said valve having a diaphragm, a spring acting on said diaphragm and tending to close said valve, and means to permit the gas on the low pressure side of said expansion-valve to act on opposite sides of said diaphragm, substantially as described.

3. In a refrigerating-apparatus of the character described, the combination of a gas-compressor, a refrigerating-coil connected thereto, a supply-tank of gas under pressure, and an automatic-valve connecting said supply-tank to the system and adapted to compensate for the leakage of gas from the system by admitting gas from the tank thereto, said valve having a diaphragm, a spring acting on said diaphragm and tending to close said valve, and means subjecting both sides of the diaphragm to the pressure of the gas on the low pressure side of said expansion-valve, said means causing said gas to exert a greater pressure on the diaphragm tending to close the valve than to open it, substantially as described.

4. In a refrigerating-appliance of the character described, the combination of a gas-compressor, a refrigerating coil connected thereto, a supply-tank of gas under pressure and an automatic-valve connecting said supply-tank to the system and adapted to compensate for the leakage of gas from the system by admitting gas from the tank thereto, said valve having means to subject the valve to an opening action and to a greater closing action, both by the pressure of the gas on the low pressure side of the valve, substantially as described.

5. In a refrigerating-appliance of the character described, the combination of a gas-compressor, a refrigerating-coil connected thereto, a supply-tank of gas under pressure, and an automatic-valve connecting said supply-tank to the system and adapted to compensate for a leakage of gas from the system by admitting gas from the tank thereto, said valve having an adjustable spring tending to close the valve and means to subject said valve to an opening action and to a greater closing action, both by the pressure of the gas on the low pressure side of the valve, substantially as described.

6. In a refrigerating-system of the character described, the combination of a gas-compressor, a refrigerating-coil connected thereto, a supply-tank of gas under pressure, and an automatic-valve connecting said supply-tank to the system and adapted to compensate for the leakage of gas from the system by admitting gas from the tank thereto, said valve having a controlling diaphragm held at its edge, and means to subject said diaphragm to a valve-opening action and to a greater valve-closing action, both by the pressure of the gas on the low-pressure side of the valve, substantially as described.

7. In a refrigerating-system of the character described, the combination of a gas-compressor, a refrigerating-coil receiving gas from said compressor, an expansion-valve between said compressor and refrigerating-coil, a gas supply-tank, and an automatic-valve connecting said tank to said system on the low pressure side of said expansion-valve and adapted to compensate for the leakage of gas from the system by admitting gas from the tank thereto, substantially as described.

8. In a refrigerating-system of the character described, the combination of a gas-compressor, a refrigerating-coil, a condenser between the compressor and said refrigerating-coil, an expansion-valve between said condenser and said refrigerating-coil, a gas supply-tank receiving heat from said condenser, and an automatic-valve connecting said tank to said system on the low-pressure side of said expansion-valve and adapted to compensate for the leakage of gas from the system by exerting gas from the tank thereto, substantially as described.

9. In a refrigerating-appliance of the character described, the combination of a gas-compressor, a refrigerating-coil connected thereto, a supply-tank of gas under pressure, an automatic-valve connecting said supply-tank to the system and adapted to compensate for the leakage of gas from the system by admitting gas from the tank thereto, a manually-operated valve between said automatic-valve and said tank, and a detachable connection between said manual and automatic-valves permitting removal and replacement of the tank, substantially as described.

10. In a refrigerating-system of the character described, the combination of a refrigerating-coil, a gas-compressor, a condenser receiving the compressed-gas from said compressor, and a gas supply-tank connected to the system and located adjacent to said condenser to receive heat therefrom, substantially as described.

11. In a refrigerating-system of the character described, the combination of a refrigerating-coil, a gas-compressor, a condenser receiving the compressed-gas from the compressor, a gas supply-tank connected to the system and located adjacent to said condenser to receive heat therefrom, and an automatic-valve between said tank and refrigerating-system which automatically replenishes the supply of gas in the system from the tank, substantially as described.

12. In a refrigerating-system of the character described, the combination of a refrigerating-coil, a gas-compressor, a condenser receiving the compressed-gas from said compressor, and a gas supply-tank connected to the system and located inside said condenser, substantially as described.

13. In a refrigerating-system of the character described, the combination of a refrigerating-coil, a gas-compressor, a condenser in the form of an open-ended pipe-coil receiving the compressed-gas from the compressor, and a gas supply-tank detachably connected to the system, located inside of said coil-condenser, and removable through an open end of said condenser, substantially as described.

14. In a refrigerating-system of the character described, the combination of a support, a gas-compressor and a driving-motor therefor mounted on said support, a condenser receiving the compressed-gas from said compressor located in the base portion of said support, and a gas supply-tank connected to the system and also located in the base portion of said support, substantially as described.

15. In a refrigerating-system of the character described, the combination of a support, a gas-compressor and a driving-motor therefor mounted on said support, a condenser-coil receiving the compressed-gas from said compressor and located in the base portion of said support, and a gas-supply-tank connected to the system and located in the base portion of said support inside of said condenser-coil, substantially as described.

16. In a refrigerating-system of the character described, the combination of a support, a double gas-compressor mounted on said support, a motor substantially centrally located on said support between the two portions of said compressor, a condenser-coil receiving compressed-gas from said compressor and located in the base portion of said support, and a gas supply-tank connected to the system and also located in the base portion of said support inside of said condenser-coil, substantially as described.

17. In a refrigerating-system of the character described, the combination of a support, a gas-compressor on said support, a driving-motor for said compressor on said support, a condenser receiving compressed-gas from said compressor located in the base portion of said support, a gas supply-tank connected to the system and also located in the base portion of said support, an oil-separator at one end of said support between the compressor and the condenser, and an automatic-valve at the other end of said support between said supply-tank and the system, substantially as described.

18. In a refrigerating-system of the character described, the combination of a support, a gas-compressor on said support, a driving-motor therefor mounted on said support, a condenser receiving compressed-gas from said compressor and located in a perforated base portion of said support and a gas supply-tank connected to the system detachably and also located in the base-portion of said support, said support having an open end permitting removal of the tank therethrough, substantially as described.

19. In a refrigerating-system of the character described, the combination of a refrigerating-coil, a gas-compressor, and a condenser-coil between said compressor and refrigerating-coil, said condenser-coil comprising two pipes one within the other, the inner pipe being adapted to contain a cooling medium, the space between the inner and outer pipe being adapted to accommodate the compressed gas received from said compressor, and a gas supply-tank inside of said condenser-coil, substantially as described.

GUSTAVE F. MAISCH.